US008093877B2

(12) United States Patent
You et al.

(10) Patent No.: US 8,093,877 B2
(45) Date of Patent: *Jan. 10, 2012

(54) TRANSIENT VOLTAGE COMPENSATION APPARATUS AND POWER SUPPLY USING THE SAME

(75) Inventors: Yun-Jiun You, Taipei (TW); Hsiang-Jui Hung, Taipei (TW); Chun-San Lin, Taipei (TW); Han-Hsun Chen, Taipei (TW); Sun-Chen Yang, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 36 days.

This patent is subject to a terminal disclaimer.

(21) Appl. No.: 12/725,457

(22) Filed: Mar. 17, 2010

(65) Prior Publication Data

US 2010/0171474 A1 Jul. 8, 2010

Related U.S. Application Data

(63) Continuation of application No. 11/847,349, filed on Aug. 30, 2007, now Pat. No. 7,714,559.

(30) Foreign Application Priority Data

Aug. 31, 2006 (TW) .............................. 95132146 A

(51) Int. Cl.
*G05F 1/40* (2006.01)
(52) U.S. Cl. ........................................ 323/284; 323/271
(58) Field of Classification Search .................. 323/271, 323/282, 284, 288, 351
See application file for complete search history.

(56) References Cited

U.S. PATENT DOCUMENTS

| | | | | | |
|---|---|---|---|---|---|
| 5,319,252 | A | * | 6/1994 | Pierce et al. ................... | 327/170 |
| 6,130,526 | A | * | 10/2000 | Yang et al. .................... | 323/272 |
| 6,304,067 | B1 | * | 10/2001 | Wrathall ....................... | 323/282 |
| 6,674,383 | B2 | * | 1/2004 | Horsley et al. ................ | 341/152 |
| 6,950,514 | B2 | * | 9/2005 | Enriquez et al. .............. | 379/413 |
| 7,132,820 | B2 | * | 11/2006 | Walters et al. ................ | 323/288 |
| 7,233,469 | B2 | * | 6/2007 | Vinciarelli et al. ............ | 361/78 |

* cited by examiner

*Primary Examiner* — Jessica Han
(74) *Attorney, Agent, or Firm* — Jianq Chyun IP Office

(57) ABSTRACT

A transient voltage compensation apparatus and a power supply using the same are provided. The power supply mainly uses a compensation circuit coupled between an input terminal and an output terminal of a power converter. When a load of the power supply is switched in a very short time, a power coupled to the compensation circuit is retrieved to compensate the output of the power supply, such that the output voltage is kept steady, and the transient response of the power supply is increased.

19 Claims, 6 Drawing Sheets

TRANSIENT VOLTAGE COMPENSATION APPARATUS AND POWER SUPPLY USING THE SAME

CROSS-REFERENCE TO RELATED APPLICATION

This application is a continuation application of and claims the priority benefit of Ser. No. 11/847,349, filed on Aug. 30, 2007, now pending, which claims the priority benefit of Taiwan application Ser. No. 95132146, filed on Aug. 31, 2006. The entirety of each of the above-mentioned patent applications is hereby incorporated by reference herein and made a part of this specification.

BACKGROUND OF THE INVENTION

1. Field of Invention

The present invention relates to a switching power supply. More particularly, the present invention relates to an apparatus used for compensating the transient output voltage undershoot when the load of a power supply is switched from a light load to a heavy load, and for compensating the transient output voltage overshoot when the load of the power supply is switched from a heavy load to a light load, and a power supply using the same.

2. Description of Related Art

As rapid development of various information and communication equipments, the design of a switching power supply with high efficiency has become a kind of knowledge combined with engineering and experience. The switching power supply is used to switch the power in many applications, including computers, illumination converters, and telecommunication equipments. Taking the DC to DC switching power supply as an example, during the short time for the load to be switched from the light load to the heavy load, since the energy of the DC to DC switching power supply cannot be supplied in time, the output voltage is reduced in a very short time, thus causing an undershoot. However, in many applications, a voltage output must be steady, and the problem that the voltage output drops in a very short time must be limited within a tolerable scope.

The USA manufacturer, Intel Corporation, has established a regulation of Voltage Regulator Down (VRD) standard. In the VRD standard, the output voltage of the power supply is regulated following the demand of the CPU.

However, when the modern CPU is operated under a high load, its power consumption is up to hundreds of watts. When the CPU is operated under a low load, its power consumption is generally about 5 Watts. Generally, the core voltage of the modern CPU is approximately between 1V and 2V. Supposing the core voltage of a CPU is 1V, and supposing its power consumption is 100 Watts when being operated under a high load, at this time, the power supply must supply a current of 100 A, and if the CPU is operated under a low load, the power supply is only required to supply a current of, for example, 5 A.

If the CPU is switched from a low load to a high load, the load of the power supply is also switched from a light load to a heavy load, and at this time, the voltage of the power supply will be suddenly dropped. When the output voltage outputted from the power supply is excessively dropped at instant, the CPU will be entered the protection state due to the drop of the core voltage, and thereby the computer is crashed. Furthermore, the CPU may also be damaged. In addition, as for a computer user, it is not acceptable that the computer is crashed when working. When the CPU is switched from operating under a high load into operating under a low load, the load of the power supply is also switched from the heavy load into the light load, and at this time, the voltage of the power supply will be suddenly arisen, which not only causes an additional power consumption of the CPU due to the increase of the core voltage, but also may damage the CPU.

SUMMARY OF THE INVENTION

The present invention is directed to providing a transient voltage compensation apparatus and a power supply using the same, wherein when an output of a power converter is switched from a light load to a heavy load, an additional compensation energy is supplied to the load, such that the output voltage is kept steady, and the transient response of the power supply is increased.

The present invention is also directed to providing a transient voltage compensation apparatus, which is used to control a power converter, wherein when an output of the power converter is switched from a heavy load to a light load, an output voltage is kept steady, and the transient response of the power supply is increased.

The present invention is further directed to providing a power supply using the transient voltage compensation apparatus, which is used to reduce the arising or dropping of an output voltage in a very short time when an output of the converter is changing, such as is switched from a heavy load to a light load, so that the output voltage is kept steady, and the transient response of the power supply is increased.

A transient voltage compensation apparatus of the present invention is connected to a power converter having an output terminal. The transient voltage compensation apparatus comprises an operational amplifier, a DC blocking element, a control module, and a compensation circuit. The operational amplifier is coupled to the output terminal and has a compensation output terminal. The DC blocking element has a first terminal coupled to the compensation output terminal and a second terminal. The control module is coupled to the second terminal and has an control terminal and a reference signal terminal. The compensation circuit is coupled to the control terminal and has a power supply terminal and a compensation terminal, wherein the power supply terminal receives a compensative power supply and the compensation terminal is coupled to the output terminal.

In the transient voltage compensation apparatus according to a preferred embodiment of the present invention, the compensation circuit comprises an impedance element and a switching element. One terminal of the impedance element is the power supply terminal of the compensation circuit. A switching control terminal of the switching element is the control terminal of the compensation circuit, a first switching terminal of the switching element is coupled to the other terminal of the impedance element, and a second switching terminal of the switching element is the compensation terminal of the compensation circuit.

The present invention provides a power supply, which comprises a power converter, an operational amplifier, a switching comparator circuit, a DC blocking element, a control module, and a compensation circuit. The power converter comprises an input terminal and an output terminal. The operational amplifier is coupled to the output terminal and has a compensation output terminal. The DC blocking element has a first terminal coupled to the compensation output terminal and a second terminal. The switching comparator circuit is coupled to the compensation output terminal and receives a saw-tooth signal, and generates a pulse width modulation (PWM) signal according to the difference between the signal of the compensation output terminal and the saw-tooth signal, so as to control the power converter. The control module is coupled to the second terminal and the reference signal terminal and has an control terminal. The compensation circuit is coupled to the control terminal and has a power supply terminal and a compensation terminal, wherein the compensation terminal is coupled to the output terminal.

As for the power supply according to a preferred embodiment of the present invention, the compensation circuit comprises an impedance element and a switching element. One terminal of the impedance element is the power supply terminal of the compensation circuit. A switching control terminal of the switching element is the control terminal of the compensation circuit, a first switching terminal of the switching element is coupled to the other terminal of the impedance element, and a second switching terminal of the switching element is the compensation terminal of the compensation circuit.

On one aspect, the present invention uses a compensation circuit coupled between an input terminal and an output terminal of the power converter. When the load of the power supply is switched from a light load to a heavy load, an AC component of the voltage output by the output terminal is retrieved, and the on/off state of the circuit between both terminals of the compensation circuit is controlled, therefore, the output voltage does not drop in a very short time when the load is switched from the light load to the heavy load. On the other aspect, the present invention uses a compensation circuit coupled between the output terminal and the ground. When the load of the power supply is switched from the heavy load to the light load, an AC component of the signal output by the output terminal is retrieved, and the on/off state of the compensation circuit is controlled. Then, the circuit between both terminals of the compensation circuit consumes the additional energy generated by the power supply, such that the output voltage is steady, and the transient response of the power supply is increased.

In order to make the aforementioned and other objects, features and advantages of the present invention comprehensible, preferred embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the prior art of the previous power supply, the output voltage of the power supply will be suddenly changed when the load is switched from the heavy load to the light load or light load to heavy load, which not only causes inconvenience to the user, but also damages load. Therefore, the present invention provides an apparatus for compensating the transient voltage and a power supply using the apparatus. The embodiments of the present invention will be described below with reference to the accompanying drawings.

Figure 1:
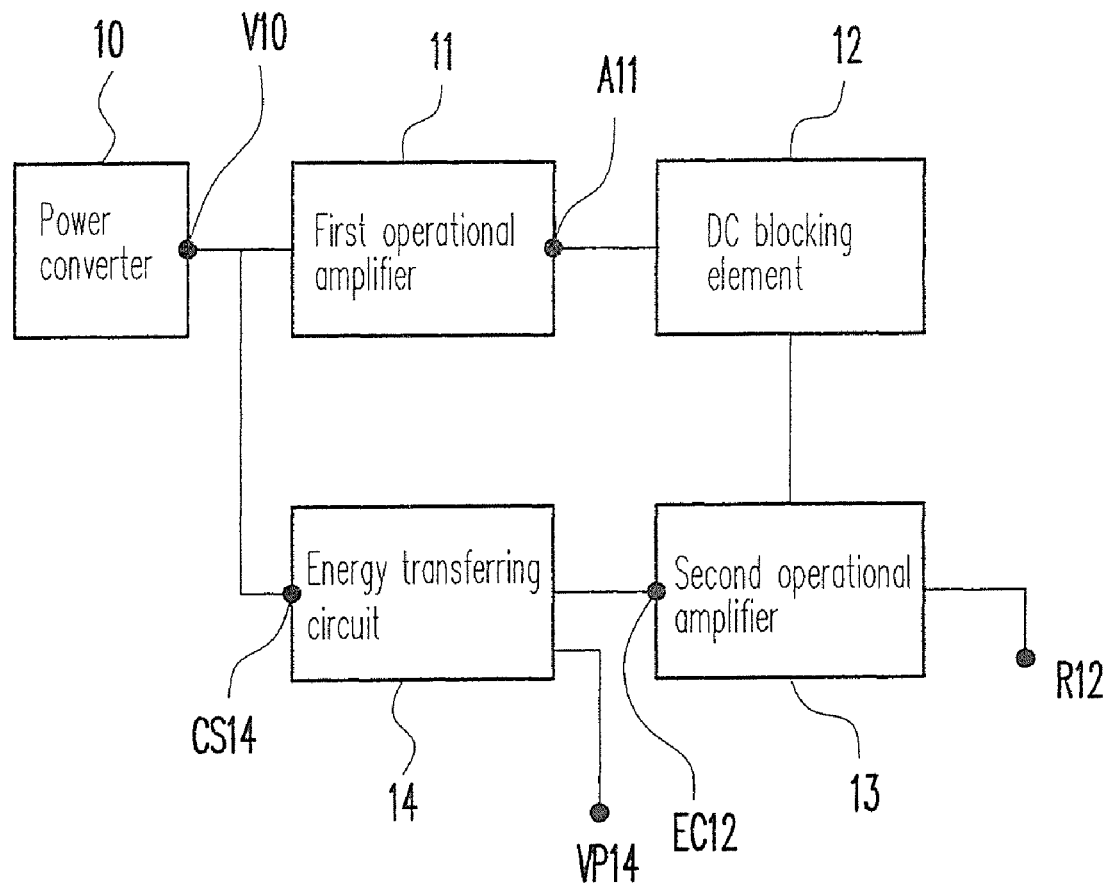
FIG. 1 is a circuit diagram of a power supply using a transient voltage compensation apparatus according to an embodiment of the present invention.

FIG. 1 is a circuit diagram of a power supply using the transient voltage compensation apparatus according to an embodiment of the present invention. Referring to FIG. 1, the power supply includes a power converter 10, an operational amplifier 11, a DC blocking element 12, a control module 13, and a compensation circuit 14. The operational amplifier 11 is coupled to an output terminal V10 of the power converter 10 and has a compensation output terminal A11. The DC blocking element 12 has a first terminal and a second terminal, and the first terminal is coupled to the compensation output terminal A11. The control module 13 is coupled to the second terminal of the DC blocking element 12 and a reference signal terminal R12 and has an control terminal EC12. The compensation circuit 14 is coupled to the control terminal EC12 and has a power supply terminal VP14 and a compensation terminal CS14, wherein the power supply terminal VP14 receives a compensative power supply and the compensation terminal CS14 is coupled to the output terminal V10 of the power converter 10.

It should be noted that, although a possible configuration of the circuits of the transient voltage compensation apparatus and the power supply using the same have been described in the above embodiment, persons of ordinary skill in the art should know that the coupling and design manners of the compensation circuit 14 are different for various manufacturers, and thus the application of the present invention is not limited to such possible configuration. In other words, as long as the compensation circuit 14 is coupled between the output terminal of the power converter 10 and a compensation power source, and when the load is switched in a very short time, the power coupled to the compensation circuit is retrieved to compensate the output of the power supply, which has already met the spirits of the present invention.

Several embodiments are cited below, so as to facilitate those skilled in the art to easily implement the present invention.

Figure 2:
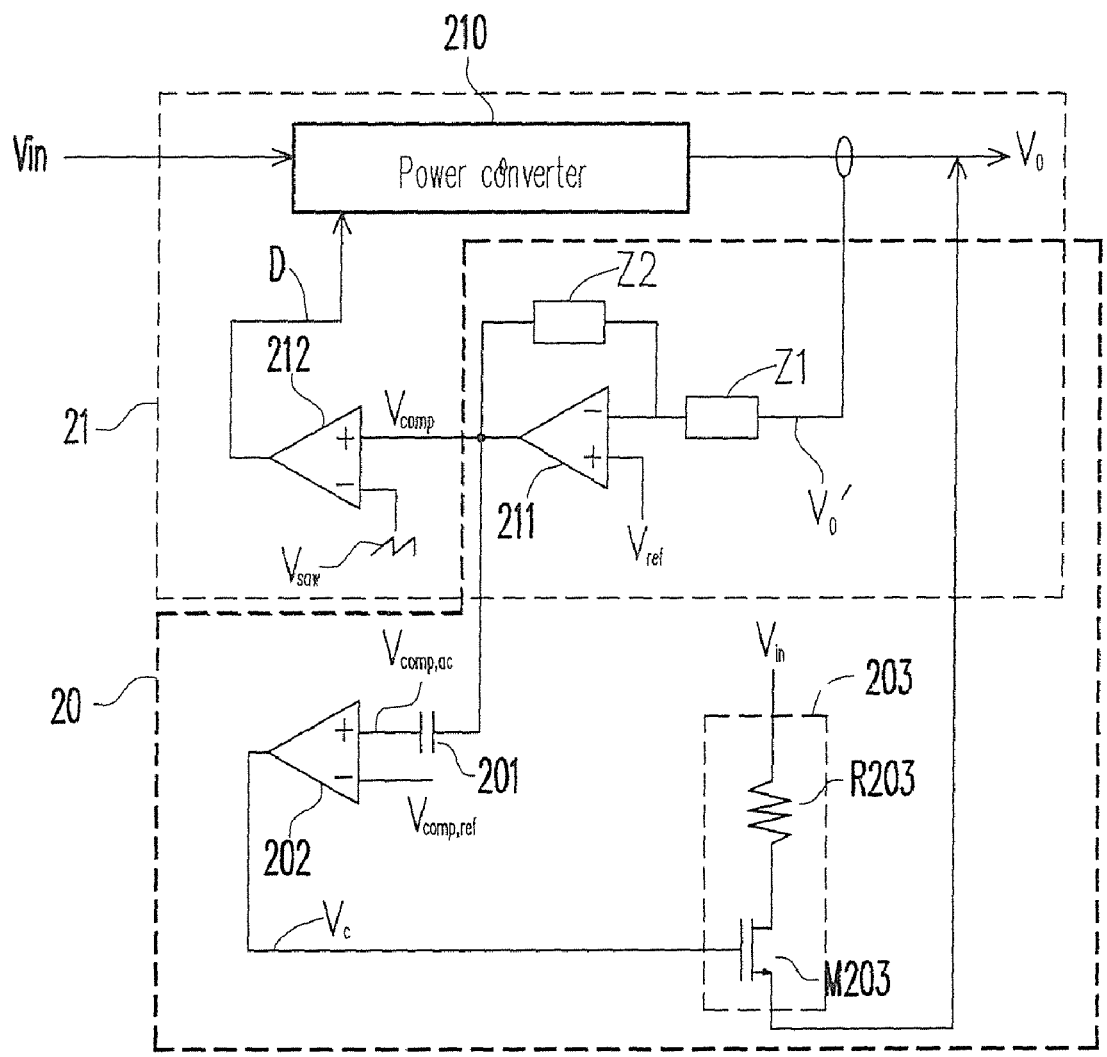
FIG. 2 is a circuit diagram of the transient voltage compensation apparatus according to the embodiment of FIG. 1.

FIG. 2 is a circuit diagram of the transient voltage compensation apparatus according to the embodiment of FIG. 1. Referring to FIG. 2, the circuit enclosed by the dashed line 20 is the circuit of the transient voltage compensation apparatus according to an embodiment of the present invention, and the circuit enclosed by the dashed line 21 is the conventional power converter and the control circuit thereof. The circuit in this embodiment includes a power converter 210, a first impedance circuit Z1, a second impedance circuit Z2, an operational amplifier 211, a switching comparator circuit 212, a DC blocking element 201, an operational amplifier 202, and a compensation circuit 203. In this embodiment, the compensation circuit 203 includes a transistor M203 and a resistor R203 used as switching elements. In addition, the DC blocking element 201 is implemented as a capacitor. It is assumed herein that the input voltage $V_{in}$ is higher than the output voltage $V_o$.

In the above circuit of FIG. 2, the power converter and the control circuit thereof 21 include a power converter 210, an operational amplifier 211 and a switching comparator circuit 212. The operational amplifier 211 receives an output voltage $V_o$ (output terminal) of the power converter and a first reference signal $V_{ref}$, and then outputs a compensation signal $V_{comp}$ (compensation output terminal) according to the difference between the output voltage $V_o$ and the first reference signal $V_{ref}$. The switching comparator circuit 212 receives the compensation signal $V_{comp}$ and a saw-tooth signal $V_{saw}$, and generates a pulse width modulation (PWM) signal D according to the difference between the compensation signal $V_{comp}$ and the saw-tooth signal $V_{saw}$, so as to control the power converter 210 (input terminal). However, the operation of these components is clearly known by persons of ordinary skill in the art, which thus will not be described in great detail. Similarly, the power converter may be implemented as, for example, buck, buck-boost, or various topological structures (forward or flyback) derived there-from, which thus will not be described in great detail.

Figure 3:
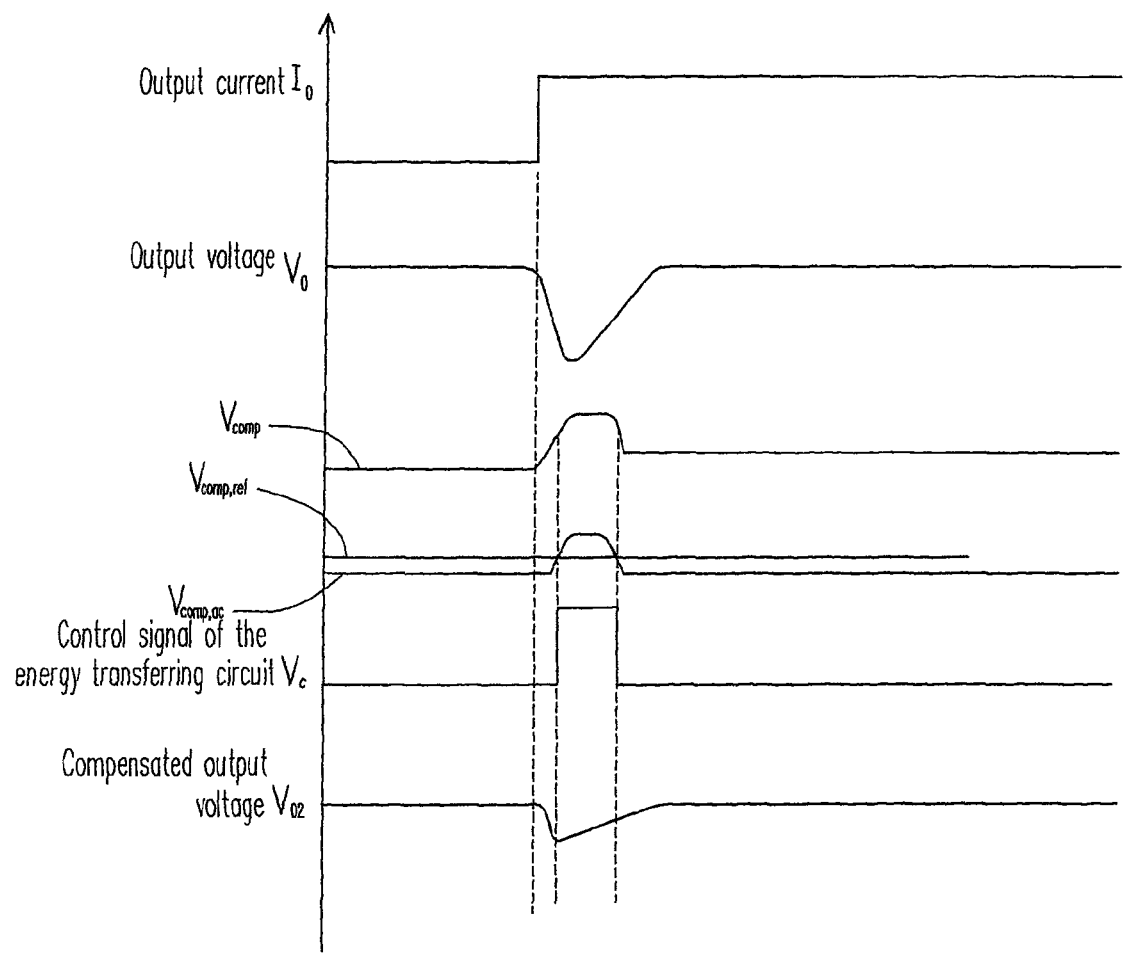
FIG. 3 is an operation waveform diagram of the circuit according to the embodiment of FIG. 2 of the present invention.

FIG. 3 is an operation waveform diagram of the circuit according to the embodiment of FIG. 2 of the present invention. Referring to both FIG. 2 and FIG. 3, when the light load is switched to the heavy load, the output current $I_o$ arises in a very short time, and as a result, the output voltage $V_o$ drops in a very short time. The transient voltage compensation apparatus according to an embodiment of the present invention shares an operational amplifier 211 (the operational amplifier) of the conventional power supply. The operational amplifier 211 outputs a compensation signal $V_{comp}$ according to an output reference signal $V_o'$ and a first reference signal $V_{ref}$, so as to control the power converter 210. Next, the DC component of the compensation signal $V_{comp}$ is filtered via the capacitor 201 (DC blocking element), and the AC compensation signal $V_{comp,ac}$ is output to the operational amplifier 202 (the control module).

Then, the operational amplifier 202 outputs a control signal $V_c$ of the compensation circuit (control terminal) after comparing the AC compensation signal $V_{comp,ac}$ with the second reference signal $V_{comp,ref}$. The transistor M203 is turned on after it receives the control signal $V_c$ of the compensation circuit at the gate (switching control terminal), and the input energy is introduced into an output terminal of the power converter 210, so as to compensate the output voltage $V_o$. The resistor R203 is used to limit current, so as to prevent the output voltage from being excessively high caused by excessive compensation. The compensated output voltage $V_{o2}$ is obtained through the above manner, as such, the drop of the output voltage in a very short time when the light load is switched from the heavy load is compensated, and the transient response of the power supply is increased.

It should be appreciated by those skilled in the art that, the operational amplifier 202 and the switching comparator circuit 212 in the above embodiment may be implemented as a comparator or an operational amplifier. In addition, besides the N-type MOS transistor M203 in this embodiment, the switching element may be implemented as P-type MOS transistor, P or N-type JFET transistor, or P or N-type BJT transistor, etc. If the N-type transistor is used as a switching element, a high side driving circuit is required for driving the N-type transistor, which belongs to the conventional art, and thus will not be described herein in great detail. In addition, the resistor R203 may be replaced by JFET transistor operated in the linear region, MOSFET transistor operated in the linear region or BJT transistor operated in the linear region, and thus the present invention is not limited to this.

Figure 4:
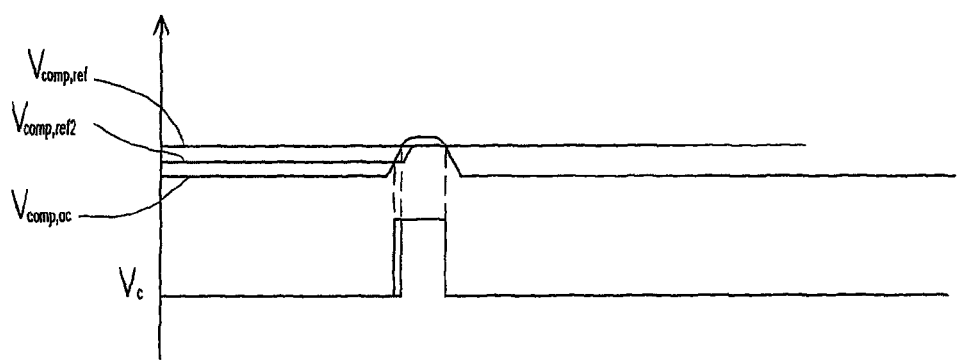
FIG. 4 is an operation waveform diagram according to an embodiment of FIG. 2 of the present invention.

FIG. 4 is another operation waveform diagram according to an embodiment of the present invention. The above waveform mainly changes the original second reference signal $V_{comp,ref}$ to a second reference signal $V_{comp,ref2}$ in an AC form. Therefore, the switching element (M203) may be turned on ahead of time, thereby effectively reducing the output under voltage effect when the load is switched from light load to heavy load.

Figure 5:
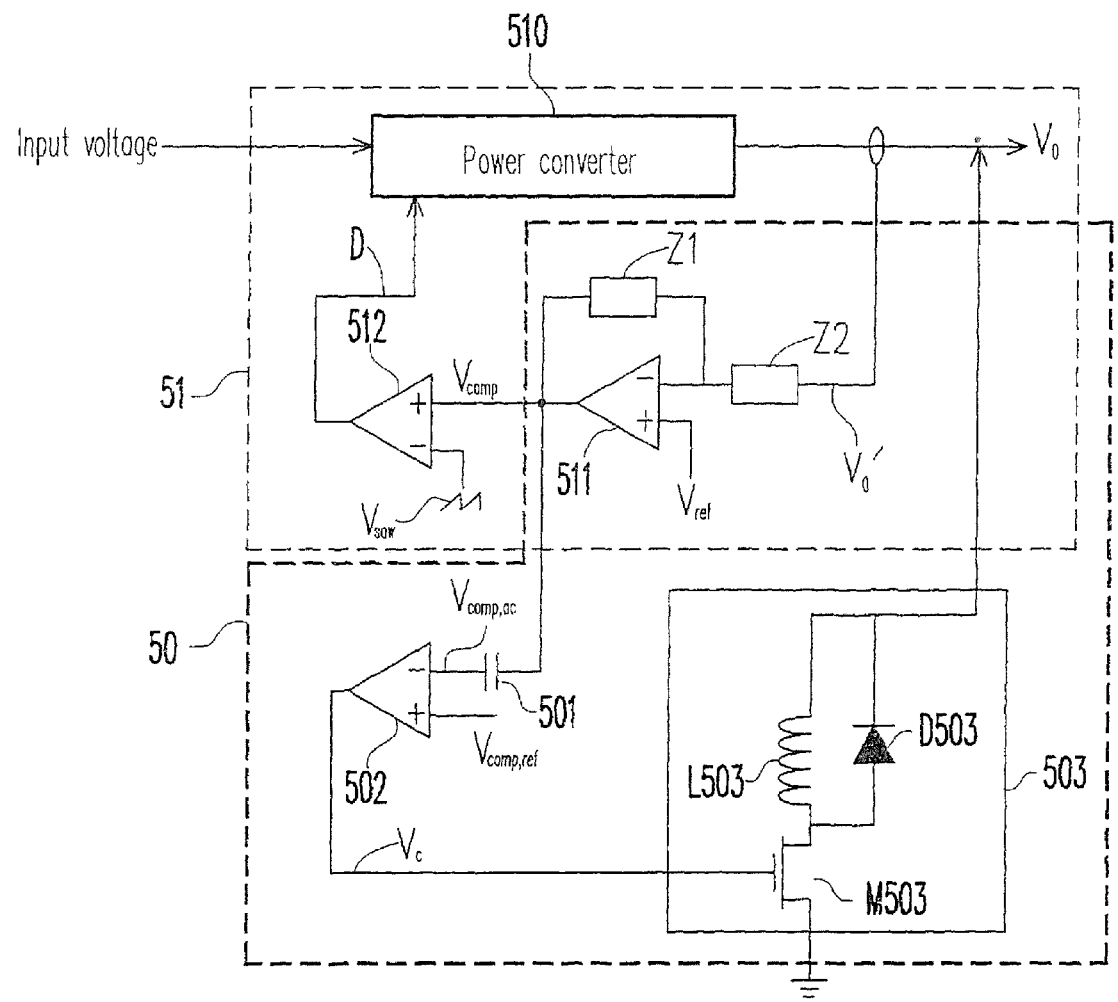
FIG. 5 is a circuit diagram of a power supply using a transient voltage compensation apparatus according to an embodiment of the present invention.

FIG. 5 is a circuit diagram of a power supply using a transient voltage compensation apparatus according to an embodiment of the present invention. The circuit enclosed by the dashed line 50 is the transient voltage compensation apparatus according to an embodiment of the present invention, and the circuit enclosed by the dashed line 51 is the conventional power converter and the control circuit thereof. Referring to FIG. 5, the circuit in this embodiment includes a power converter 510, a first impedance circuit Z1, a second impedance circuit Z2, an operational amplifier 511, a switching comparator circuit 512, a DC blocking element 501, an operational amplifier 502, and a compensation circuit 503. In this embodiment, the compensation circuit 503 includes a transistor M503, an inductor L503 and a diode D503 used as switching elements. Furthermore, the DC blocking element 501 is implemented as a capacitor.

In the circuit of FIG. 5, the power converter and the control circuit thereof 51 include a power converter 510, an operational amplifier 511 and a switching comparator circuit 512. The operational amplifier 511 receives an output voltage $V_o$ (output terminal) output by the power converter and a first reference signal $V_{ref}$, and then outputs a compensation signal $V_{comp}$ according to the difference between the output voltage $V_o$ and the first reference signal $V_{ref}$ (compensation output terminal). The switching comparator circuit 512 receives the compensation signal $V_{comp}$ and the saw-tooth signal $V_{saw}$, and generates a pulse width modulation (PWM) signal D according to the difference between the compensation signal $V_{comp}$ and the saw-tooth signal $V_{saw}$, so as to control the power converter 510 (input terminal). However, the operation of these components is known by persons of ordinary skill in the art, which thus will not be described in great detail. Similarly, the power converter may be implemented as, for example, buck, buck-boost, buck-boost, or various topological structures derived there-from, which thus will not be described in great detail.

Figure 6:
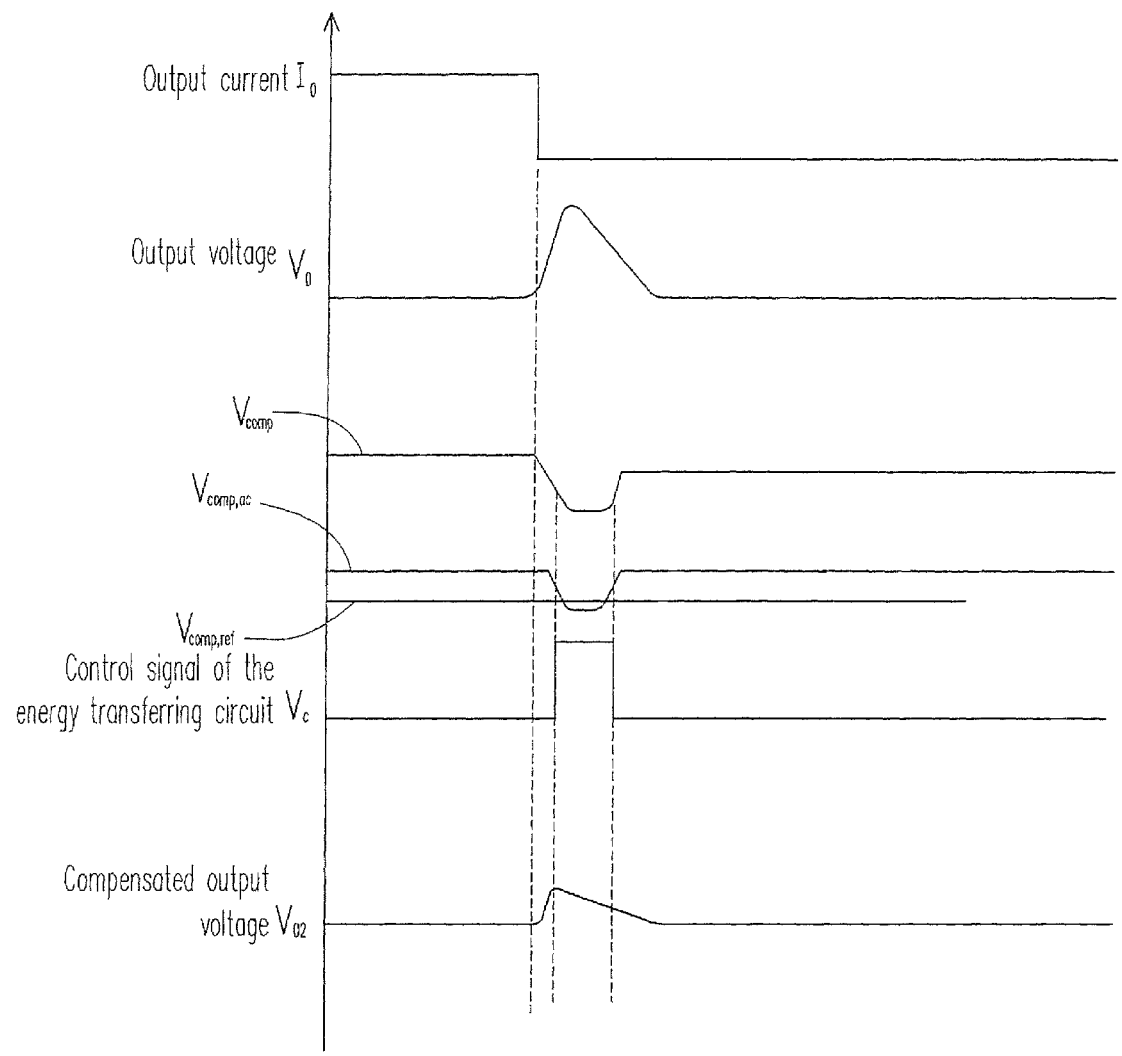
FIG. 6 is an operation waveform diagram of the circuit according to the embodiment of FIG. 5 of the present invention.

FIG. 6 is an operation waveform diagram of the circuit according to the embodiment of FIG. 5 of the present invention. Referring to both FIG. 5 and FIG. 6, when the load is switched from heavy load to light load, the output current $I_o$ drops in a very short time, such that the output voltage $V_o$ arises in a very short time. The transient voltage compensation apparatus according to an embodiment of the present invention shares the operational amplifier 511 (the operational amplifier) of the conventional power supply. The operational amplifier 511 outputs a compensation signal $V_{comp}$ according to the output voltage $V_o$ and the first reference signal $V_{ref}$, so as to control the power converter 510. Then, the DC component of the compensation signal $V_{comp}$ is filtered via the capacitor 501 (DC blocking element), and the AC compensation signal $V_{comp,ac}$ is output to the operational amplifier 502 (the control module). The operational amplifier 502 outputs a control signal $V_c$ (control terminal) of the compensation circuit after comparing the AC compensation signal $V_{comp,ac}$ with the second reference signal $V_{comp,ref}$. The transistor M503 is turned on after it receives the control signal $V_c$ of the compensation circuit at the gate (switching control terminal). Then, the additional energy is consumed by the inductor L503 and the diode D503, and a compensated output voltage $V_{o2}$ is obtained, such that the increase of the output voltage in a very short time when the heavy load is switched to the light load is compensated.

Persons of ordinary skill in the art should appreciate that the operational amplifier 502 and the switching comparator circuit 512 in the above embodiment may be implemented as a comparator or an operational amplifier, and thus the present invention is not limited herein.

Figure 7:
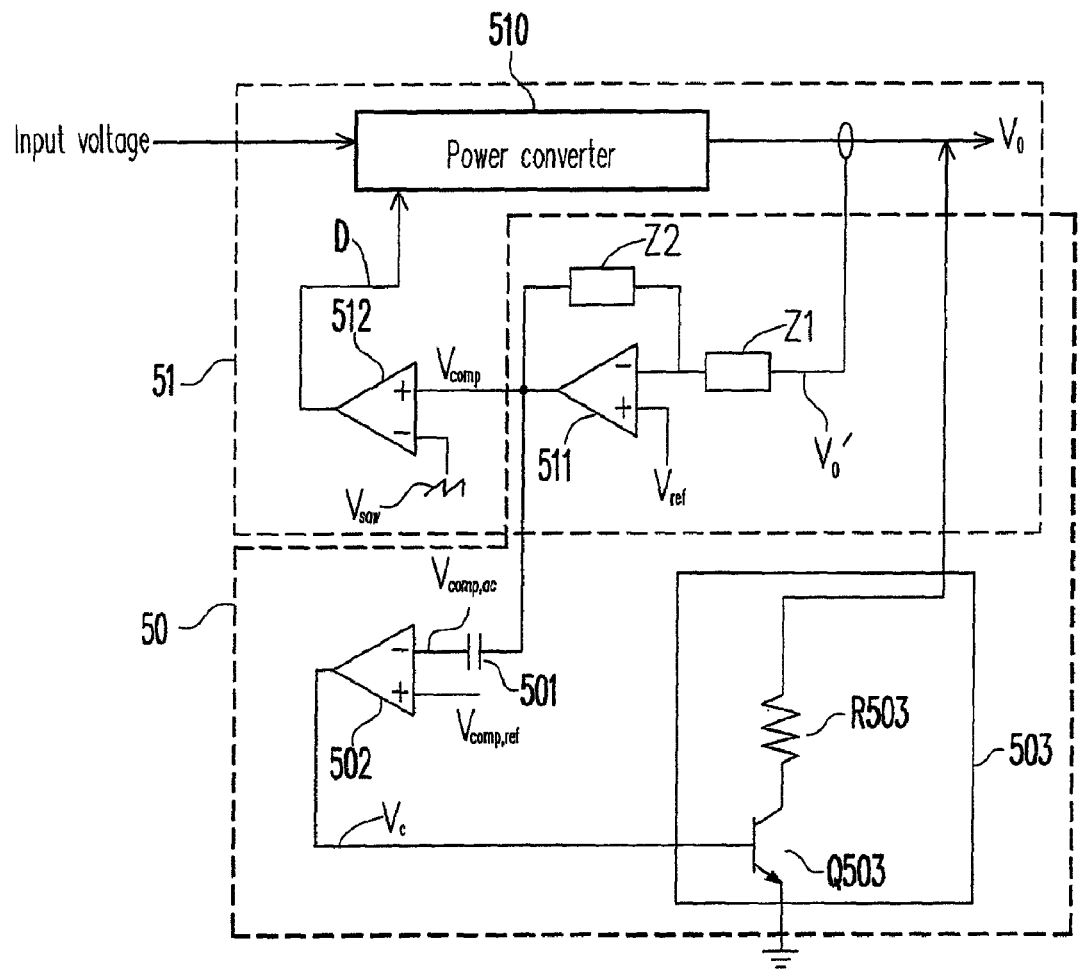
FIG. 7 is a circuit diagram of a power supply using a transient voltage compensation apparatus according to an embodiment of the present invention.

FIG. 7 is a circuit diagram of a power supply using a transient voltage compensation apparatus according to an embodiment of the present invention. This embodiment differs from the embodiment in FIG. 1 in that the compensation circuit 503 is changed to be implemented as a BJT transistor Q503 and a resistor R503. The operation of this embodiment is similar to that of FIG. 1. Similarly, the additional energy is consumed by the resistor R503, so as to obtain a compensated output voltage $V_{o2}$. However, it is known to those skilled in the art that, the switching element may be implemented as a JFET transistor, or MOSFET transistor, and furthermore, the resistor R503 may also be replaced with the JFET transistor operated in the linear region, MOSFET transistor operated in the linear region or BJT transistor operated in the linear region, and thus the present invention is not limited herein.

Figure 8:
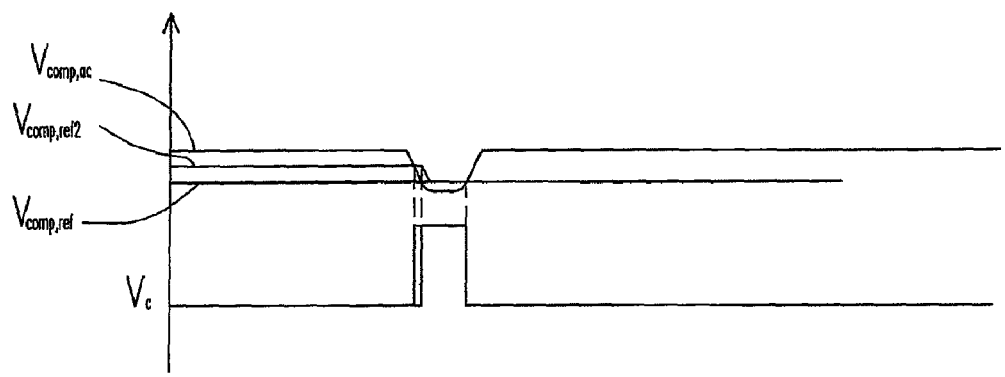
FIG. 8 is an operation waveform diagram of the circuit according to embodiments of FIG. 5 and FIG. 7 of the present invention.

FIG. 8 is another operation waveform diagram according to an embodiment of the present invention. The above waveform mainly changes the original second reference signal $V_{comp,ref}$ to a second reference signal $V_{comp,ref2}$ in an AC form, such that the switching element (M503, Q503) may be turned on ahead of time, and the output over voltage effect when the load is switched from heavy load to light load is effectively reduced.

In view of the above, the present invention employs a compensation circuit coupled between an input terminal and an output terminal of the power converter. When the load of the power supply is switched from light load to heavy load, the AC component of the voltage output by the output terminal is retrieved, and the on/off state of a circuit between both terminals of the compensation circuit is controlled. Therefore, the output voltage does not drop in a very short time when the load is switched from light load to heavy load, such that the output voltage is kept steady, and the transient response of the power supply is increased.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A transient voltage compensation apparatus, connected to a power converter having an input terminal and an output terminal, comprising:
    a compensation circuit having a power supply terminal and a compensation terminal, wherein the power supply terminal receives a compensative power supply and the compensation terminal is coupled to the output terminal of the power converter; and
    a control module being connected with the power converter and having a control terminal coupled to the compensation circuit, wherein the control module controls an on/off state of the compensation circuit in response to a comparison of an AC component of a voltage output by the output terminal and a reference voltage in an AC form, so as to determine whether using the compensative power supply to compensate an output of the power converter.

2. The transient voltage compensation apparatus as claimed in claim 1, wherein the compensation circuit receives a control signal output by the control terminal, and the on/off state of a circuit between the power supply terminal and the compensation terminal is determined by the control signal.

3. The transient voltage compensation apparatus as claimed in claim 1, wherein the compensation circuit comprises:
    a switching element, comprising a switching control terminal, a first switching terminal and a second switching terminal, wherein the switching control terminal is connected to the control terminal, and the second switching terminal is the compensation terminal.

4. The transient voltage compensation apparatus as claimed in claim 3, wherein the compensation circuit further comprises:
    an impedance element, coupled between the power supply terminal and the first switching terminal.

5. The transient voltage compensation apparatus as claimed in claim 4, wherein the impedance element is a resistor.

6. The transient voltage compensation apparatus as claimed in claim 3, wherein the compensation circuit comprises:
    an inductor and a diode, connected in parallel and coupled between the first switching terminal and the output terminal, wherein a cathode of the diode is coupled to the output terminal, and an anode thereof is coupled to the first switching terminal.

7. The transient voltage compensation apparatus as claimed in claim 1, further comprising:
    an operational amplifier, coupled to the output terminal and having a compensation output terminal; and
    a switching comparator circuit, coupled to the compensation output terminal, receiving a saw-tooth signal, and generating a pulse width modulation (PWM) signal according to a difference between a signal of the compensation output terminal and the saw-tooth signal, so as to control the power converter.

8. The transient voltage compensation apparatus as claimed in claim 6, wherein a negative input terminal of the operational amplifier is coupled to the output terminal, a positive input terminal thereof receives a reference signal in a DC form, and an output terminal thereof is the compensation output terminal.

9. The transient voltage compensation apparatus as claimed in claim 8, further comprising:
    a first impedance circuit, having one terminal coupled to the output terminal, and another terminal coupled to the negative input terminal of the operational amplifier; and
    a second impedance circuit, having one terminal coupled to the negative input terminal of the operational amplifier, and another terminal coupled to the output terminal of the operational amplifier.

10. A transient voltage compensation apparatus, connected to a power converter having an input terminal and an output terminal, comprising:
    a DC blocking element having a first terminal and a second terminal, wherein the first terminal is coupled to the power converter, and the second terminal provides an AC component of a voltage output by the output terminal;

a control module coupled to the second terminal and having a reference signal terminal and a control terminal, wherein the reference signal terminal receives a reference voltage in an AC form; and a compensation circuit coupled to the control terminal and having a power supply terminal and a compensation terminal, wherein the power supply terminal receives a compensative power supply and the compensation terminal is coupled to the output terminal, wherein the control module controls an on/off state of the compensation circuit in response to a comparison of the AC component of the voltage output by the output terminal and the reference voltage in the AC form, so as to determine whether using the compensative power supply to compensate an output of the power converter.

11. The transient voltage compensation apparatus as claimed in claim 10, wherein the DC blocking element is a capacitor.

12. The transient voltage compensation apparatus as claimed in claim 10, wherein the compensation circuit receives a control signal output by the control terminal, and the on/off state of a circuit between the power supply terminal and the compensation terminal is determined by the control signal.

13. The transient voltage compensation apparatus as claimed in claim 10, wherein the compensation circuit comprises:

a switching element, comprising a switching control terminal, a first switching terminal and a second switching terminal, wherein the switching control terminal is connected to the control terminal, and the second switching terminal is the compensation terminal.

14. The transient voltage compensation apparatus as claimed in claim 13, wherein the compensation circuit further comprises:

an impedance element, coupled between the power supply terminal and the first switching terminal.

15. The transient voltage compensation apparatus as claimed in claim 14, wherein the impedance element is a resistor.

16. The transient voltage compensation apparatus as claimed in claim 13, wherein the compensation circuit comprises:

an inductor and a diode, connected in parallel and coupled between the first switching terminal and the output terminal, wherein a cathode of the diode is coupled to the output terminal, and an anode thereof is coupled to the first switching terminal.

17. The transient voltage compensation apparatus as claimed in claim 10, further comprising:

an operational amplifier, coupled to the output terminal and having a compensation output terminal; and a switching comparator circuit, coupled to the compensation output terminal, receiving a saw-tooth signal, and generating a pulse width modulation (PWM) signal according to a difference between a signal of the compensation output terminal and the saw-tooth signal, so as to control the power converter.

18. The transient voltage compensation apparatus as claimed in claim 17, wherein a negative input terminal of the operational amplifier is coupled to the output terminal, a positive input terminal thereof receives a reference signal in a DC form, and an output terminal thereof is the compensation output terminal.

19. The transient voltage compensation apparatus as claimed in claim 18, further comprising:

a first impedance circuit, having one terminal coupled to the output terminal, and another terminal coupled to the negative input terminal of the operational amplifier; and a second impedance circuit, having one terminal coupled to the negative input terminal of the operational amplifier, and another terminal coupled to the output terminal of the operational amplifier.

* * * * *